Feb. 9, 1932.   H. L. KRAEFT   1,844,401
VEHICLE BODY CONSTRUCTION
Filed Feb. 21, 1930
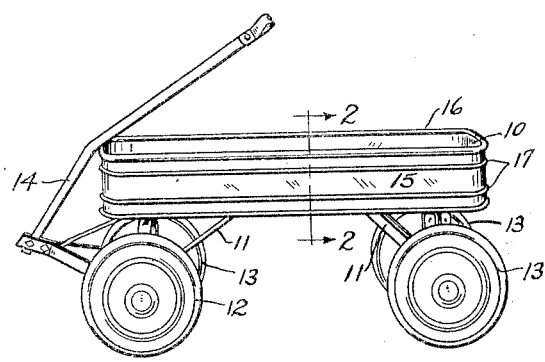
FIG.-1
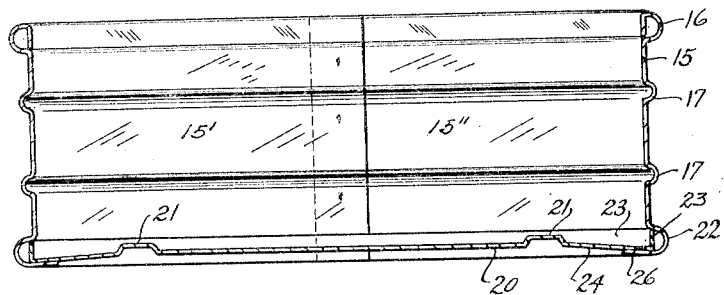
FIG.-2
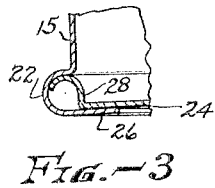
FIG.-3
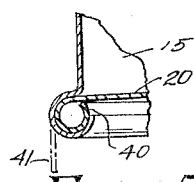
FIG.-5
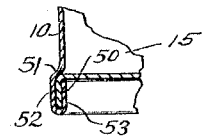
FIG.-6
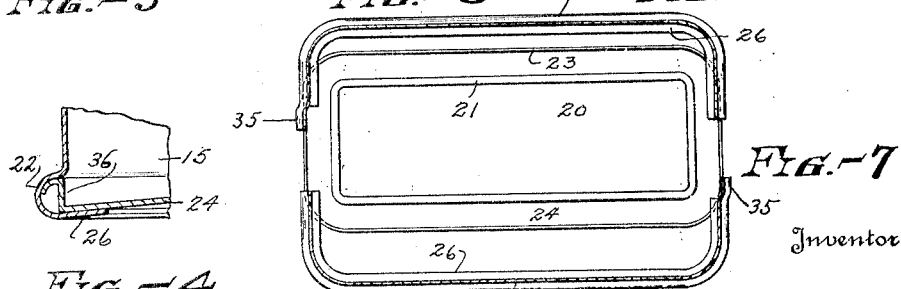
FIG.-4
FIG.-7
Inventor
Herman L. Kraeft.
By Bates, Golrick & Teare
Attorney Patented Feb. 9, 1932

1,844,401

UNITED STATES PATENT OFFICE

HERMAN L. KRAEFT, OF CLEVELAND, OHIO, ASSIGNOR TO THE MURRAY OHIO MANUFACTURING COMPANY, OF CLEVELAND, OHIO, A CORPORATION OF OHIO

VEHICLE BODY CONSTRUCTION

Application filed February 21, 1930. Serial No. 430,234.

This invention relates to vehicle body constructions and is especially adaptable to children's vehicles. The bodies of children's vehicles, such as coaster wagons and the like were heretofore constructed of wood, but have recently been manufacturerd of sheet metal. Considerable difficulties have been encountered in the metal body construction. One of the most prominent of these difficulties is the joining of the sides of the body to the bottom. A child's vehicle or coaster wagon must necessarily be of a very rigid construction to afford the greatest strength possible. Hence, the sides must be secured to the bottom in such a manner as to withstand great strains and excessive jolts.

The general object of this invention is to provide an improved arrangement for joining the side members of the body of a vehicle with the base or bottom member, which arrangement will reinforce the body.

Another object of this invention is to provide a pressed metal seam to be used in vehicle body construction, and which will be capable of withstanding hard usage, such as as child's coaster wagon is subjected to.

A further object is to provide a lock seam between the bottom and sides of the body of a child's vehicle, the manufacturing cost of which will be comparatively low.

Another object is to provide a joint between the sides of a vehicle body and the bottom which joint will not require the use of bolts, rivets or welding, but which will increase the strength of the structure.

Another object is to form a seam for locking members of a vehicle body together wherein the respective seam portions may be completely pre-formed and readily assembled.

A preferred embodiment of my invention is illustrated in the drawings, and is hereinafter described in the specification, and the essential novel features of the invention are set forth in the claim.

In the drawings, Fig. 1 is a perspective of a child's coaster wagon embodying my invention; Fig. 2 is a vertical cross section taken through the body of the wagon, and is indicated by the lines 2—2 in Fig. 1; Figs. 3, 4, 5 and 6 are fragmentary vertical sections on an enlarged scale illustrating modified forms of self-licking seams which I propose to use; Fig. 7 is a horizontal section illustrating the method used in assembly of certain of the parts.

In the drawings, the vehicle comprises a body 10, which is supported by suitable under gear members 11, carrying suitable axles on which are mounted the wheels 12 and 13. Associated with the forward under gear member 11 is the usual king pin arrangement and handle 14.

The body 10 comprises a box portion which may be constructed of one or more pieces of sheet metal and which as shown has four sides or side members 15. As shown, the box is formed of two separate members 15' and 15'' (see Fig. 7), the ends being joined together to form a continuous wall. It will be noted that I have shown each of the box members as having a roll or head 16 adjacent the top, and intermediate ribs or channels 17. This construction results in an unusually staunch and sturdy body box.

The bottom of the box as shown in Fig. 2, comprises a sheet metal member 20 which lies substantially in one plane and has upwardly extending reinforcing channel portions 21. The under gearing members 11 may be of any suitable form but preferably of a sturdy channel steel construction, and are secured to the bottom member 20 by suitable bolts (not shown).

In the construction shown in Fig. 2, the side members 15' and 15'' have outwardly extending beads or grooves 22 which terminate in flanges 26. Each flange extends inwardly from the bead a distance beyond the vertical planes of the side members, and underlies the bottom 20.

The bottom has an upwardly extending flange 23 which fits into the channels formed by the beads 22 of the side members. Adjacent the flange 23 the bottom preferably bows upwardly as at 24. The outer margins of the bottom member rest on the flanges 26 of the side members.

In the modified construction shown in Fig. 3, the side member 15 has an outwardly extending annular bead or groove 22 similar to that shown in Fig. 2. The bottom member, however, has an upwardly extending flange 28, which, adjacent its upper portion, is curved outwardly and upwardly, and then outwardly and downwardly so that the outer face of this bead-like portion will coincide with the inner face of the bead or groove 30 of the side member. The bead has an inwardly extending flange 26 which supports the bottom member by engaging the marginal edges of the inclined portion thereof.

In the modification shown in Fig. 4, the side member has an annular bead or groove 22 adjacent its lower edge as in Figs. 2 and 3. The bottom member has an upwardly extending flange 36, the uppermost portion of which is curved outwardly and downwardly forming a substantially Z-shaped section, which is retained in position in the bead or groove 35 by means of the inwardly extending flange 26 of the bead.

In the embodiments illustrated in Figs. 2, 3 and 4, and heretofore described, the construction of the seam is such, that the seam portions of both the side and bottom members may be completely formed before assembly. The preferred method of assembly is as follows. Referring to Fig. 7 wherein the two members comprising the box sides are shown as substantially identical channel shaped sections 15′ and 15″, these are simply slid toward each other, guided by the bottom member in the channel formations 22, and the ends of the sections 15′ and 15″ suitably joined. Each member is preferably offset at one of its ends as at 35 to overlap the adjacent end of the other member sufficiently to allow these adjacent ends to be spot welded, riveted or bolted together, as desired.

Obviously the box 15 may comprise a single piece the ends of which would extend toward each other substantially at right angles to form one end of the box. In such case the opposite longer sides are spread apart sufficiently to allow the bottom to be inserted into the embrace of the channel bead 22, and afterward the two free ends are brought together and joined.

In the modification illustrated in Fig. 5 the bottom member 20 is formed with a continuous downwardly extending full bead 40 and the side member 15 is bent outwardly and then downwardly to fit the bead 46, as shown by the dotted lines in Fig. 5. The bottom is then placed in position and the downwardly extending lip 41 is then bent inwardly and upwardly around the bead 40, retaining the latter in position.

In Fig. 6 the bottom has a downwardly extending flange 50, the side member 15 is bent outwardly and then downwardly forming an offset 51, which is substantially the thickness of the metal. The bottom 50 is then placed in position against the offset and the flange 52 of the side member is then bent upwardly, as at 53, embracing the downwardly extending flange of the bottom member 50.

It will be seen from the foregoing description that I have provided a lock seam for joining the bottom and sides of a child's vehicle, such as a coaster wagon, which is rigid in construction and which is of exceedingly great strength, and will stand excessive strains and severe jolts.

I have also provided a joint between a vehicle body and the flanged bottom, which joint will not require rivets, bolts or welding, wherein the flange of the bottom extends beyond the vertical plane of the sides and is embraced by an outwardly extending groove or channel in the side members in such a manner as to prevent movement of the flange in any direction.

I claim:

The combination in a vehicle body of a sheet metal side member, having substantially straight sides terminating at their lower edges in an outwardly extending substantially semi-circular groove, and a sheet metal bottom member having a substantially vertical flange extending upwardly therefrom and continuously around the edge thereof, the uppermost portion of said flange being curved outwardly and downwardly, whereby when the bottom member is joined to the side member by inserting the uppermost portions of said flange in the groove, the vertical portion of the flange will form a continuation of the straight side of said side member in the same vertical plane.

In testimony whereof, I hereunto affix my signature.

HERMAN L. KRAEFT.